US009683861B2

(12) United States Patent
Takano et al.

(10) Patent No.: US 9,683,861 B2
(45) Date of Patent: Jun. 20, 2017

(54) ESTIMATED ROUTE PRESENTATION APPARATUS AND ESTIMATED ROUTE PRESENTATION METHOD

(71) Applicant: NISSAN MOTOR CO., LTD., Yokohama-Shi, Kanagawa (JP)

(72) Inventors: Teruhisa Takano, Kanagawa (JP); Akihiko Kouzai, Kanagawa (JP); Shinji Yasuhara, Kanagawa (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 15/024,000

(22) PCT Filed: Jul. 11, 2014

(86) PCT No.: PCT/JP2014/068564
§ 371 (c)(1),
(2) Date: Mar. 22, 2016

(87) PCT Pub. No.: WO2015/045568
PCT Pub. Date: Apr. 2, 2015

(65) Prior Publication Data
US 2016/0216128 A1    Jul. 28, 2016

(30) Foreign Application Priority Data
Sep. 27, 2013  (JP) ................................. 2013-200964

(51) Int. Cl.
*H04N 7/18*  (2006.01)
*B60R 1/00*  (2006.01)
(Continued)

(52) U.S. Cl.
CPC ................ *G01C 21/36* (2013.01); *B60R 1/00* (2013.01); *B60W 40/101* (2013.01);
(Continued)

(58) Field of Classification Search
CPC .. G01C 21/36; G06T 7/73; G06T 7/13; G06T 2207/30252; B62D 15/0295; H04N 5/247;
(Continued)

(56) References Cited

U.S. PATENT DOCUMENTS 6,825,779 B2 *  11/2004  Yasui ..................... G08G 1/166
                                                          340/435
2010/0238051 A1 *  9/2010  Suzuki ..................... B60R 1/00
                                                          340/932.2
(Continued)

FOREIGN PATENT DOCUMENTS

JP         63-011403 A       1/1988
JP        2004-201223 A      7/2004
(Continued)

*Primary Examiner* — Michael J Zanelli
(74) *Attorney, Agent, or Firm* — Young Basile Hanlon & MacFarlane, P.C.

(57) ABSTRACT

An estimated route presentation apparatus including a control device is provided. The control device executes an image acquisition function to acquire a captured image captured by a camera provided on the vehicle, an estimated route calculation function to: detect an end part of a diagram displayed on a road surface from an image of the road surface included in the captured image; obtain a center of gyration of the vehicle traveling, on the basis of changes in the direction and distance of the movement of the end part as the vehicle travels; and calculate an estimated route of the vehicle with reference to the center of gyration, and a presentation control function to present the calculated estimated route.

8 Claims, 12 Drawing Sheets

(51) Int. Cl.
*B60R 21/00* (2006.01)
*G01C 21/36* (2006.01)
*B60W 40/101* (2012.01)
*G06K 9/46* (2006.01)
*H04N 5/247* (2006.01)
*B62D 15/02* (2006.01)
*G06T 7/73* (2017.01)
*G06T 7/13* (2017.01)

(52) U.S. Cl.
CPC ....... *B62D 15/0295* (2013.01); *G06K 9/4604* (2013.01); *G06T 7/13* (2017.01); *G06T 7/73* (2017.01); *H04N 5/247* (2013.01); *B60R 2300/305* (2013.01); *B60R 2300/806* (2013.01); *B60W 2520/20* (2013.01); *G06T 2207/30252* (2013.01)

(58) Field of Classification Search
CPC .............. G06K 9/4604; B60W 40/101; B60W 2520/20; B60R 1/00; B60R 2300/305; B60R 2300/806
See application file for complete search history.

(56) References Cited

U.S. PATENT DOCUMENTS

| | | | | |
|---|---|---|---|---|
| 2011/0025489 | A1* | 2/2011 | Shimoda | B60R 1/00 340/459 |
| 2011/0095910 | A1* | 4/2011 | Takano | B60R 1/00 340/932.2 |
| 2013/0046441 | A1* | 2/2013 | Marczok | B60Q 9/005 701/41 |
| 2014/0043483 | A1* | 2/2014 | Schuder | H04N 7/18 348/148 |
| 2014/0085474 | A1* | 3/2014 | Lee | B62D 15/0275 348/148 |
| 2016/0251030 | A1* | 9/2016 | Okada | B62D 15/0295 345/633 |

FOREIGN PATENT DOCUMENTS

| | | |
|---|---|---|
| JP | 2008-128867 A | 6/2008 |
| JP | 2012-162130 A | 8/2012 |
| JP | 2012-176656 A | 9/2012 |

* cited by examiner

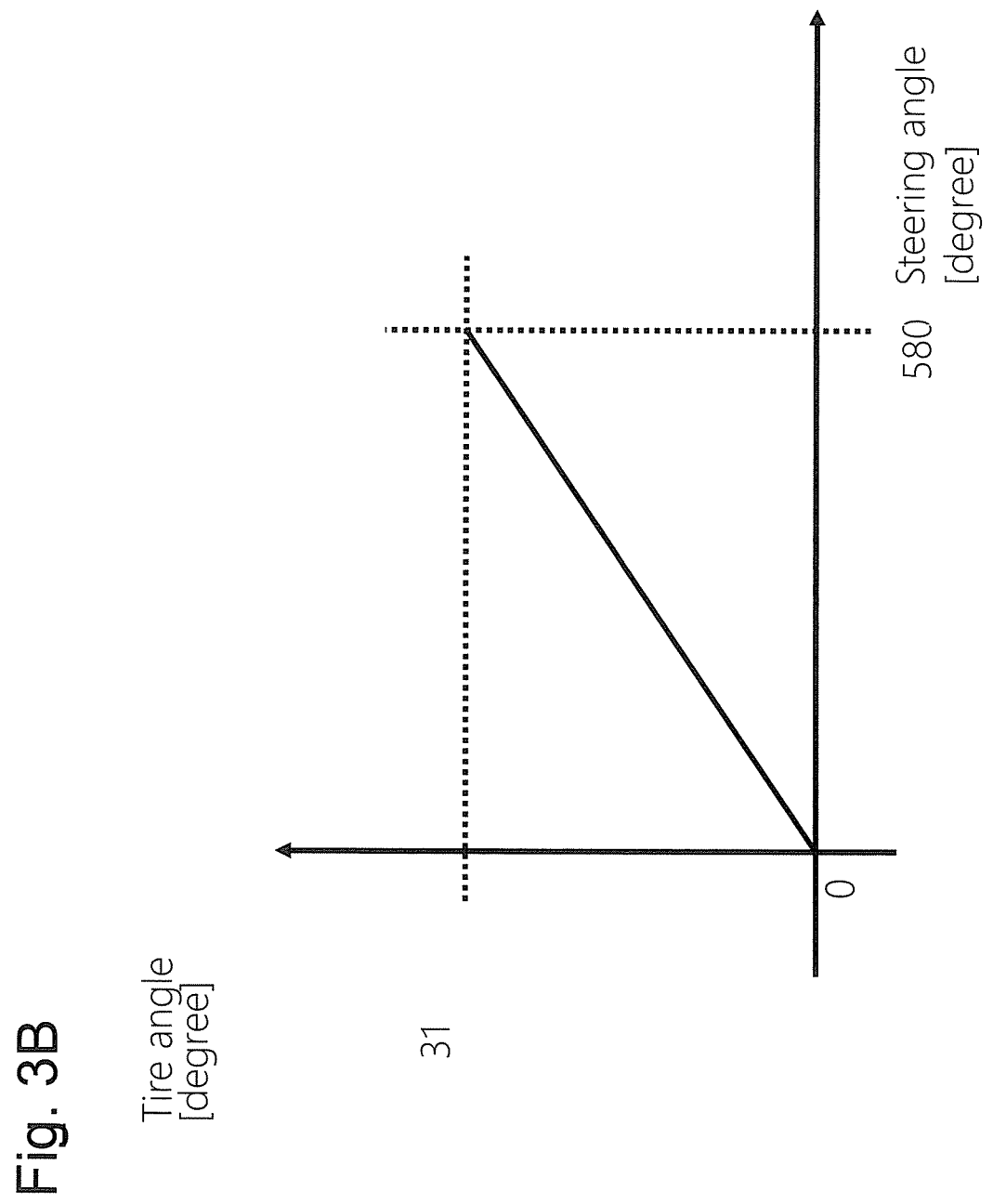

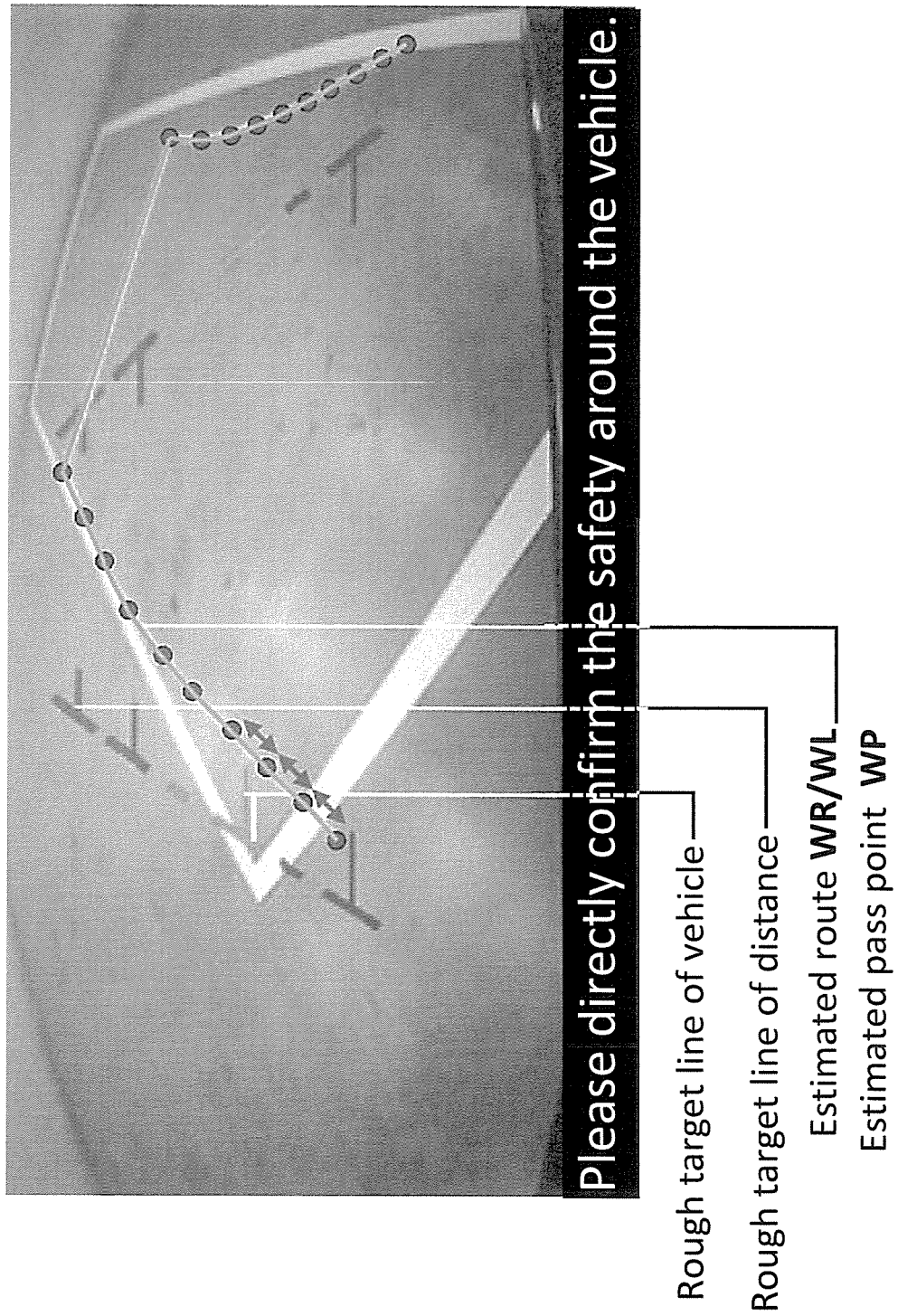

ESTIMATED ROUTE PRESENTATION APPARATUS AND ESTIMATED ROUTE PRESENTATION METHOD

CROSS REFERENCE TO RELATED APPLICATION

The present application claims priority to Japanese Patent Application No. 2013-200964 filed on Sep. 27, 2013, incorporated by reference in its entirety.

TECHNICAL FIELD

The present invention relates to an estimated route presentation apparatus and an estimated route presentation method which calculate and present an estimated route of a vehicle.

BACKGROUND

With regard to this kind of apparatus, a drive assist apparatus is known (See JP 2012-0162130). When the shift lever of a vehicle is operated to the reverse position, the drive assist apparatus displays an image in which an estimated trajectory of the vehicle is superimposed on rear video footage captured by an onboard camera. The estimated trajectory is calculated using a navigation ECU on the basis of detection results from onboard components, such as a speed sensor and steering sensor, and vehicle parameters.

When a route of the vehicle estimated in accordance with the steering angle is presented on a portable terminal apparatus which is not incorporated in an onboard apparatus, the terminal apparatus may have to successively acquire steering signals from the onboard apparatus. In this case, processing information requires a long time, which will raise a problem of delaying a timing of presenting the estimated route.

SUMMARY

A problem to be solved by the present invention is to present an estimated route of a vehicle without delay even on a portable terminal apparatus which is not incorporated in an onboard apparatus.

The estimated route presentation apparatus of the present invention detects a tire angle from an edge feature in a captured image captured by an onboard camera and presents an estimated route with reference to the center of gyration of the vehicle calculated on the basis of the tire angle, thereby solving the above problem.

In the present invention, the estimated route is obtained on the basis of information extracted from an image captured by the onboard camera without acquiring detection information, such as a steering angle, from an onboard apparatus. This allows a simple process to present the estimated route, and the estimated route can be presented after a short time of processing. As a result, the estimated route of the vehicle can be presented without delay even when the estimated route of the vehicle is presented on a portable terminal apparatus which is not incorporated in the onboard apparatus.

BRIEF DESCRIPTION OF THE DRAWINGS

FIG. 3B is a graph showing the relationship between a steering angle and a tire angle, which is utilized when calculating the estimated route according to the embodiment;

FIG. 7A is a view showing an example of a monitoring image on which the estimated route is superimposed.

DETAILED DESCRIPTION OF THE EMBODIMENTS

Hereinafter, embodiments of the present invention will be described with reference to the drawings. The present embodiments will be described for a case in which the present invention is applied to an estimated route presentation system 1000 comprising an onboard apparatus 200 and an estimated route presentation apparatus 100 which exchange information with each other via a wireless communication network.

Figure 1:
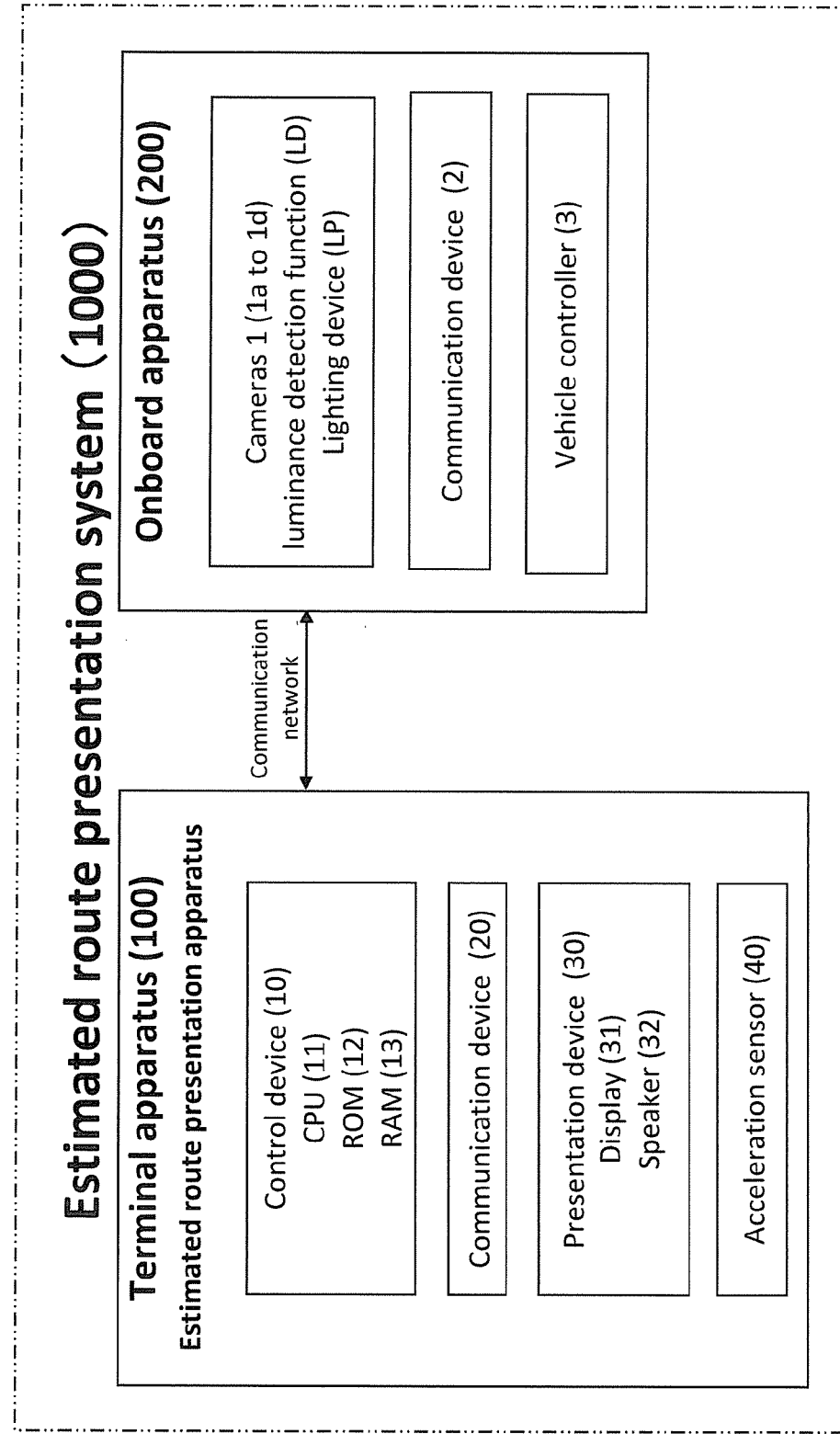
FIG. 1 is a block diagram of an estimated route presentation system according to an embodiment of the present invention.

FIG. 1 is a block diagram of the estimated route presentation system 1000 according to an embodiment of the present invention. As shown in FIG. 1, the estimated route presentation system 1000 of the present embodiment comprises a portable-type estimated route presentation apparatus 100 and an onboard apparatus 200. In the description below, the portable-type estimated route presentation apparatus 100 will also be referred to as a terminal apparatus 100.

First, the onboard apparatus 200 of the present embodiment will be described. The onboard apparatus 200 comprises one or more cameras 1a to 1d (which may also be referred to as a "camera 1" or "cameras 1" in a collective term, hereinafter), a communication device 2, and a vehicle controller 3. The cameras 1, communication device 2, and vehicle controller 3 of the onboard apparatus 200 are connected with one another via a CAN (Controller Area Network) or other onboard LAN and can mutually exchange information.

Figure 2A:
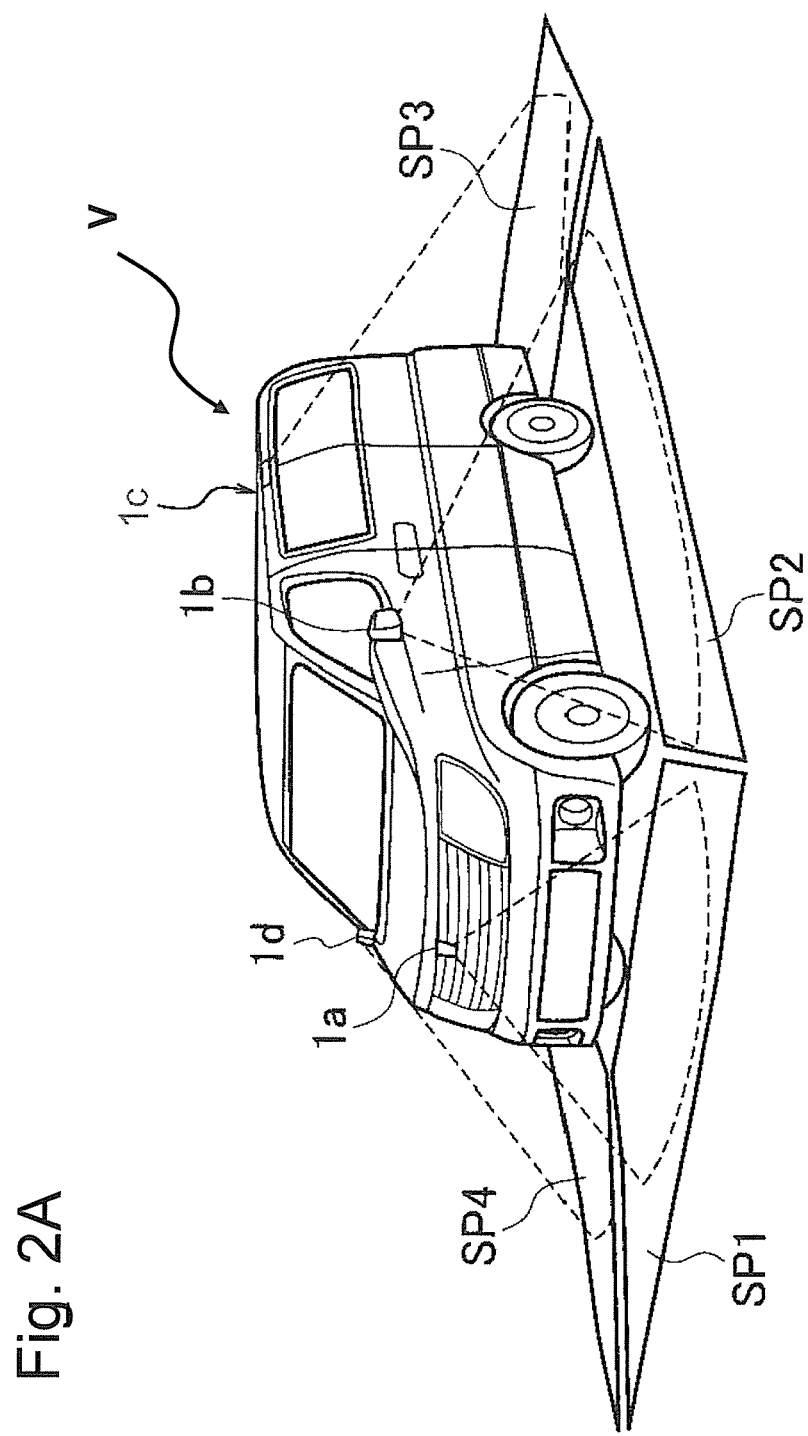
FIG. 2A is a view showing an example of an arrangement of cameras in the embodiment.

The cameras 1 are configured using image capturing elements, such as CCD (Charge Coupled Devices). In the present embodiment, wide-angle cameras having a wide image capturable (or imageable) range are used as the cameras 1. FIG. 2A is a view which shows an example of an arrangement when the cameras 1a to 1d are attached to a vehicle V. The cameras 1a to 1d are disposed (attached or mounted) at different positions outside the vehicle V and capture images in four directions around the vehicle. For example, as shown in FIG. 2A, the camera 1a, which is disposed at a predetermined position of the front of the vehicle V, such as a front grille portion, captures an image of an object or road surface which exists within an area SP1 in front of the vehicle V or in a space in front of the area SP1 (front view image). The camera 1b, which is disposed at a predetermined position of the left side of the vehicle V, such as a left side mirror portion, captures an image of an object or road surface which exists within an area SP2 at the left side of the vehicle V or in a space around the area SP2 (left-side view image). The camera 1c, which is disposed at a predetermined position of a rear (rearward) portion of the vehicle V, such as a rear finisher portion and roof spoiler portion, captures an image of an object or road surface which exists within an area SP3 in rear of the vehicle V or in a space rear of the area SP3 (back view image). The camera 1d, which is disposed at a predetermined position of the right side of the vehicle V, such as a right side mirror portion, captures an image of an object or road surface which exists within an area SP4 at the right side of the vehicle V or in a space around the area SP4 (right-side view image). The term "in rear of the vehicle" as used in the present embodiment encompasses not only the meaning of "just behind the vehicle" but also the meaning of "diagonally backward right or left side of the vehicle." Similarly, the term "in front of the vehicle" encompasses not only the meaning of "just in front of the vehicle" but also the meaning of "diagonally frontward of right or left side of the vehicle." Image processing is performed for the captured images captured by the cameras 1a to 1d to generate a desired monitoring image.

Figure 2B:
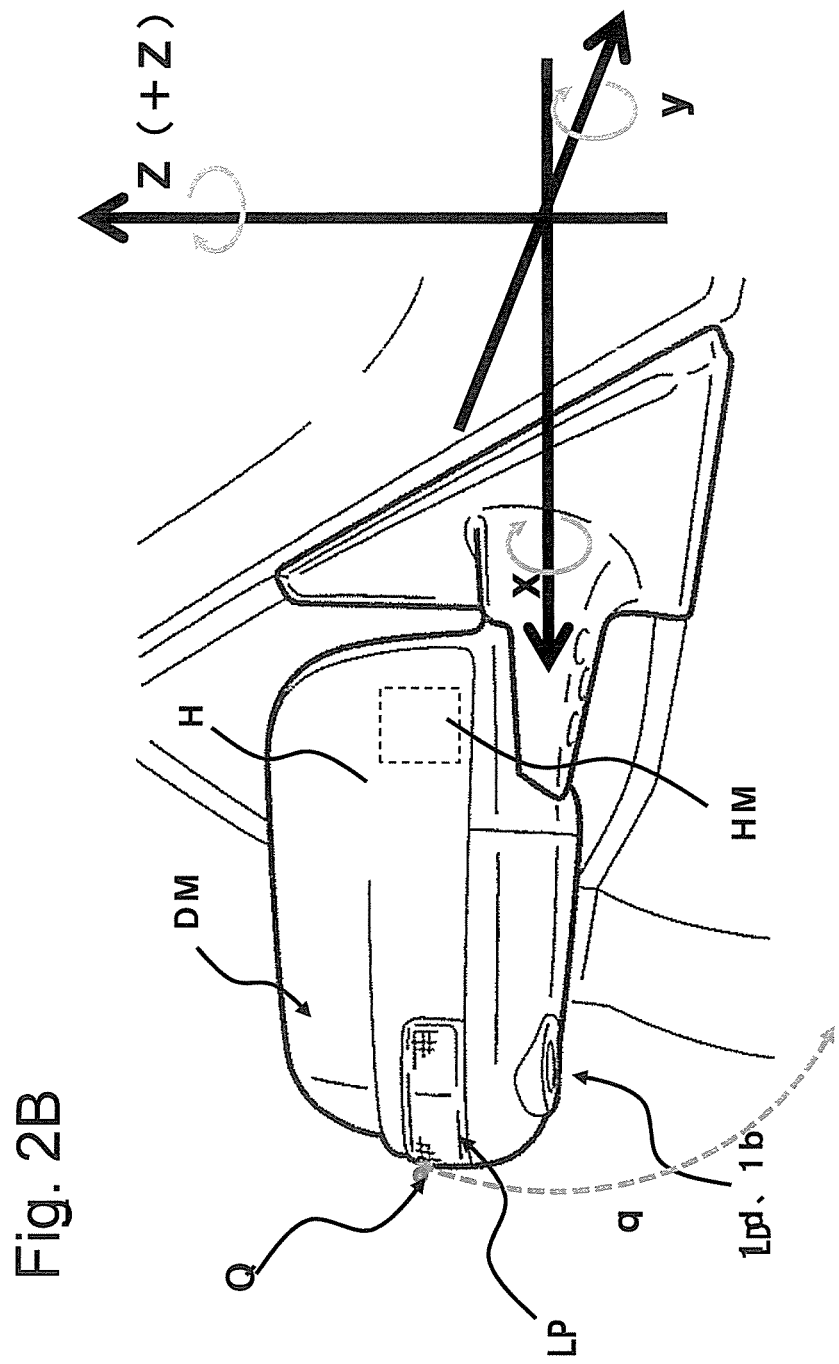
FIG. 2B is a view showing an example of a camera 1b, 1d shown in FIG. 2A.

FIG. 2B is a view of the camera 1d of the right door mirror shown in FIG. 2A, when viewed from the front side of the vehicle. The camera 1b of the left door mirror will be seen, if illustrated, symmetrically to the camera 1d of the right door mirror, so the illustration from the right door mirror is omitted. As shown in FIG. 2B, the camera 1d (1b) is provided on or in a housing H of the right door mirror (left door mirror). The camera 1d (1b) is attached to the housing H such that the image capturing direction points toward the lower side of the vehicle, i.e. toward the traveling road surface, in normal mode. As described above, the camera 1d (1b) is configured using an image capturing element, such as a CCD (Charge Coupled Device), and captures video footage in a certain image capturing direction. Although not particularly limited, it is preferred to use a wide-angle camera as the camera 1d (1b).

As shown in FIG. 2B, the door mirror of the present embodiment is provided with a lighting device LP which functions as a hazard lamp. This lighting device LP, which is provided on or in the door mirror, irradiates a region in a vicinity of the tire with irradiation light. Thus, the lighting device LP functions not only as a hazard lamp but as a flashing device which irradiates light when the camera 1 captures an image.

In addition, the door mirror of the present embodiment is provided with a luminance (or illuminance) detection device LD which detects a value of the luminance (or illuminance) around the door mirror. In the present embodiment, the camera 1d, 1b functions as the luminance detection device LD which detects a value of the luminance around the door mirror. As will be understood, the luminance detection device LD may be provided separately from the camera 1d, 1b.

A scheme of moving the camera 1d, 1b will be described below. In the housing H of each door mirror DM provided with the camera 1d, 1b of the present embodiment, a housing drive mechanism HM is provided which includes motors for rotationally driving the housing H of the door mirror DM. When supplied with power in accordance with a drive instruction from the onboard apparatus 200 or terminal apparatus 100 or an input command from a mirror control switch, the housing drive mechanism HM of the present embodiment rotationally drives the housing H around rotation axes, i.e. x-axis, y-axis, and z-axis shown in the figure, to vary the direction of the door mirror DM from right to left and up and down. Here, the x-axis, y-axis, and z-axis are directions along the wheel axis direction of the vehicle, longitudinal direction of the vehicle, and height direction of the vehicle (direction of gravity), respectively.

Specifically, the housing drive mechanism HM can vary the direction of the right door mirror DM shown in FIG. 2B around the y-axis. More specifically, when the housing H is driven around the y-axis as the rotation axis, a part of the housing H represented by a point Q in FIG. 2B can be moved downward (toward the z-axis side) along a trajectory q. In other words, the image capturing direction of the camera 1d, which has been directed downward, i.e. directed substantially vertically with respect to the road surface, can be shifted toward the vicinity of a tire of the vehicle V or toward the side surface of the tire (wheel). Therefore, by driving the housing H around the y-axis as the rotation axis, the camera 1d, 1b can capture an image of the side surface of the tire of the vehicle V and/or the boundary between the tire and the wheel. In addition, by driving the housing H of the door mirror DM around the z-axis as the rotation axis, the image capturing position of the camera 1d, 1b can be made come close to and separate from the vehicle, and the door mirror DM can be retracted (folded back toward the vehicle side). Furthermore, by driving the housing H of the door mirror DM around the x-axis as the rotation angle, the image capturing direction of the camera 1d, 1b can be adjusted back and forth. Thus, the housing drive mechanism HM allows the housing H and camera 1d, 1b to be directed not only in one direction but also in an arbitrary direction in accordance with a drive instruction which includes specifying at least any one of the x-axis component, y-axis component, and z-axis component. In this way, the housing drive mechanism HM can be operated thereby to allow the camera 1d, 1b to capture an image around the tire and shoulder of the road in normal mode and an image of the vicinity of the tire and the side surface of the tire if need arises. The specific configuration and operation of the above-described housing drive mechanism HM are not limited, and it is possible to appropriately utilize a mechanism used in a door mirror control system which has been known at the time of filing the present application.

Figure 2C:
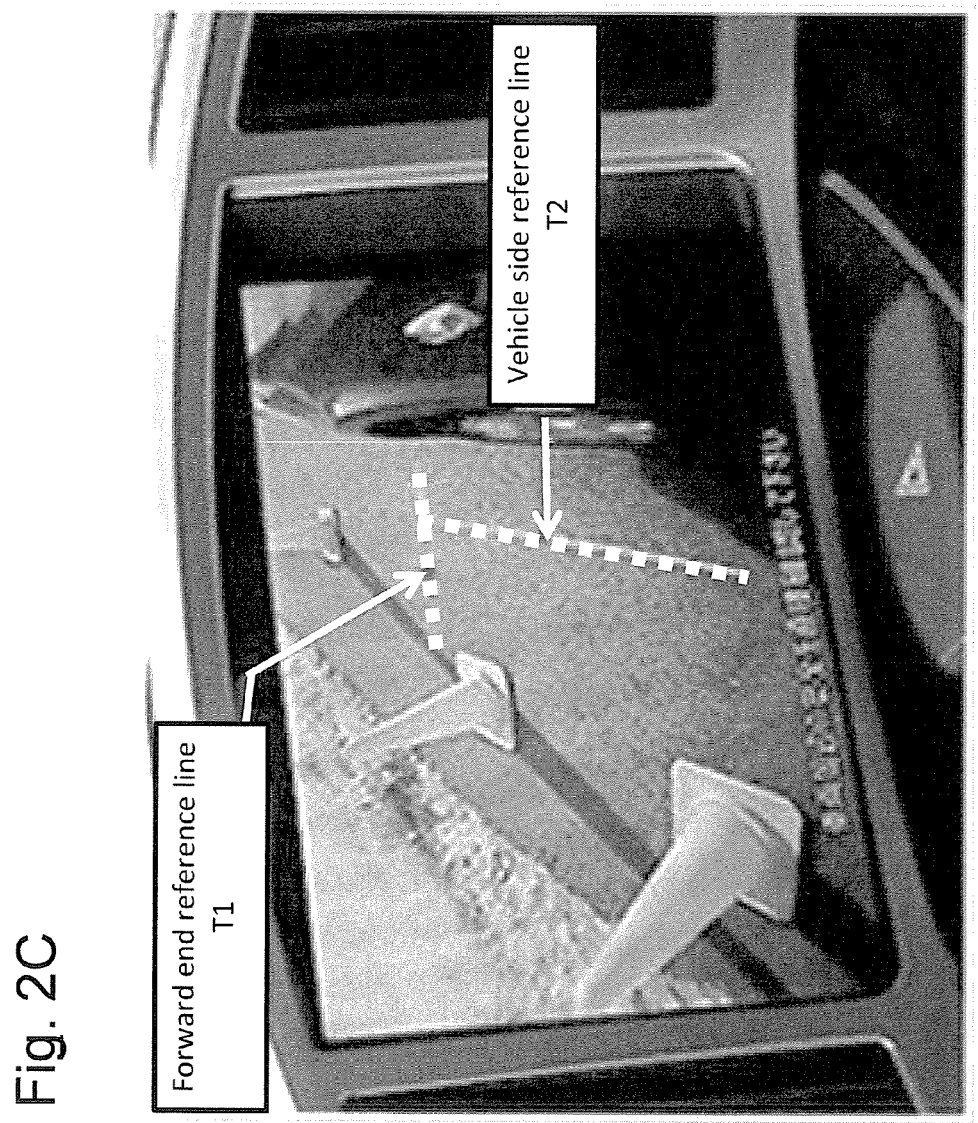
FIG. 2C is a view showing an example of a captured image by the camera 1b, 1d shown in FIG. 2B.

In the present embodiment, the camera 1d (1b) provided in or on the right or left door mirror captures an image of the side surface of a tire of the vehicle V, specifically an image of the boundary between the tire and the wheel. FIG. 2C is an example of a captured image by the camera 1b, which includes the boundary between the tire and the wheel. As described above, a wide-angle camera may be used as the camera 1d, 1b thereby to capture an image of the side surface of the tire of the vehicle V. The camera 1d, 1b may be moved to capture an image of the side surface of the tire of the vehicle V. As shown in the example of FIG. 2C, a vehicle side reference line T2 along the left side surface of the vehicle, and a forward end reference line T1 which indicates a rough target of a forward position and is along the vehicle width direction, may be superimposed on the captured image and displayed.

The communication device 2 of the onboard apparatus 200 of the present embodiment transmits the captured images by the cameras 1 and a monitoring image generated by the onboard apparatus 200 to the terminal apparatus 100. In an alternative embodiment, at least one of the cameras 1 may have a wireless communication function to transmit the captured images to the terminal apparatus 100 from the at least one of the cameras 1. In an alternative embodiment, at least one of the cameras 1 may have a wireless communication function and an image processing function to transmit the monitoring image to the terminal apparatus 100. The terminal apparatus 100 acquires at least either of the captured images by the cameras 1 or the monitoring image edited by the onboard apparatus 200 via a wireless communication network. An image captured by each camera 1 is assigned with an identifier corresponding to the location (address) of the camera 1, and the terminal apparatus 100 can identify as to which region the captured image belongs to, on the basis of the identifier. The scheme of an image conversion process for obtaining a viewpoint conversion image using coordinate conversion, and the scheme of generating from the viewpoint conversion image a monitoring image in which the vehicle and other objects around the vehicle are viewed from above, are not particularly limited, and it is possible to appropriately utilize schemes which have been known at the time of filing the present application. The monitoring image in the present embodiment is one form of a captured image which is generated from a plurality of captured images and in which the vehicle and other objects around the vehicle are viewed from above. That is, the term "captured image" encompasses a monitoring image after the viewpoint conversion process.

The monitoring image in the present embodiment is a rearrangement of a plurality of viewpoint conversion images. The viewpoint conversion images are obtained by coordinate conversion of a plurality of images captured around the vehicle by the cameras 1 onto a predetermined projection plane in which the vehicle is viewed from a certain viewpoint above the vehicle. The coordinate conversion uses image capturing parameters defined with respect to each vehicle type. Partial images of defined regions are clipped from the viewpoint conversion images obtained by the viewpoint conversion of the captured images. The partial images are clipped in accordance with the display area and display form in which information is presented by the presentation device 30 of the terminal apparatus 100. Codes for identification are appended to the partial images. Each of the codes is for identifying which direction, in terms of the vehicle, each viewpoint conversion image belongs to. The partial images of the viewpoint conversion images are rearranged with reference to these codes for identification to generate a monitoring image which represents video footage in which the vehicle is viewed from above the vehicle. This monitoring image is presented in a predetermined form on the presentation device 30. The onboard apparatus 200 may perform a generation process for a monitoring image and transmit the monitoring image to the terminal apparatus 100. In an alternative embodiment, the onboard apparatus 200 may perform acquisition of captured images by the cameras 1 and generation of viewpoint conversion images and transmit the images to the terminal apparatus 100 so that the terminal apparatus 100 can perform a final process to generate a monitoring image.

Next, the terminal apparatus 100 (estimated route presentation apparatus 100) will be described. The terminal apparatus 100 of the present embodiment is a portable terminal device 100, such as a smart-phone and tablet terminal, which has a communication function. As shown in FIG. 1, the terminal apparatus 100 comprises a control device 10, a communication device 20, a display 30, and an acceleration sensor 40.

The communication device 20 of the present embodiment exchanges information mutually with the communication device 2 of the onboard apparatus 200 separated from the terminal apparatus 100. The communication device 20 acquires the captured images from the onboard apparatus 200. The term "captured images" as used in the present invention encompasses a monitoring image generated from the captured images.

The presentation device 30 of the terminal apparatus 100 of the present embodiment presents an estimated route to be described later on its display area in a predetermined display form in accordance with a command from the control device 10 to be described later. The display form in the present embodiment is defined in accordance with rules for the display, such as the type, number, size, display time, and display period of the image or images to display. The display form is stored as display information 21 in the presentation device 30 of the terminal apparatus 100. The presentation device 30 includes, for example, a display 31 and/or a speaker 32.

In addition, the presentation device 30 of the present embodiment presents a plurality of estimated pass points which constitutes an estimated route. The estimated pass points (dods) as referred to herein are discrete points (dods) which represent an estimated route. By confirming the positions of the estimated pass points, the driver can predict the motion of the own vehicle. Moreover, the processing cost can be reduced by calculating and presenting the discrete, estimated pass points than that by calculating and presenting an estimated route.

When presenting the estimated pass points, the presentation device 30 of the present embodiment arranges the estimated pass points to have a regular interval in a display coordinate system of the display 31 of the presentation device 30. If estimated pass points having a regular interval in a coordinate system of the captured image are displayed on the display 31 without any processing, distances between adjacent estimated pass points close to the vehicle will be shorter than those far from the vehicle. If the interval of the estimated pass points is irregular, the estimated route obtained by connecting the estimated pass points will not be a smooth line and will deviate from an actual flow line (moving locus) of the vehicle. According to the present embodiment, the estimated pass points are arranged to have a regular interval in a display coordinate system of the display 31, and the estimated route obtained by connecting the estimated pass points can therefore be displayed as a smooth line in accordance with the flow line of the vehicle.

The presentation device 30 of the present embodiment superimposes and displays the estimated route and/or the estimated pass points on the captured image (including a monitoring image generated from the captured images). Superimposing and presenting the estimated route and/or the estimated pass points on the captured image allow the drive to easily confirm the position of the own vehicle and the situation around the vehicle which is traveling.

The acceleration sensor 40 of the present embodiment detects acceleration in accordance with the motion (traveling) of the terminal apparatus 100. The output value of the acceleration sensor 40 can be used to acquire the traveling direction and traveling speed of the terminal apparatus 100. When the terminal apparatus 100 is brought into the vehicle and travels with the vehicle, the output value of the acceleration sensor 40 of the terminal apparatus 100 can be considered to reflect the traveling direction and traveling speed of the vehicle. Therefore, based on the output value of the acceleration sensor 40, the terminal apparatus 100 can determine whether the vehicle is traveling straight, steering right, or steering left.

The control device 10 of the present embodiment will be described. The control device 10 is a computer comprising: a ROM (Read Only Memory) 12 which stores a program to control the operation of deriving an estimated route and causing the estimated rout to be displayed; a CPU (Central Processing Unit) 11 as an operation circuit which executes the program stored in the ROM 12 thereby to function as the estimated route presentation apparatus 100; and a RAM (Random Access Memory) 13 which functions as an accessible storage. The control device 10 of the estimated route presentation apparatus 100 according to the present embodiment can coordinate the above-described hardware with software to achieve a control function, thereby to execute the above referenced functions.

Descriptions will then be directed to an image acquisition function, an estimated route calculation function, and a presentation control function which are achieved by the control device 10 of the estimated route presentation apparatus 100.

The image acquisition function will first be described. The control device 10 acquires the captured images around the vehicle via the communication device 20. These captured images are captured by the onboard cameras 1 and include a captured image which includes at least a part of a tire of the vehicle. In the present embodiment, the control device 10 acquires a captured image which includes a tire because the tire angle is detected based on a tire image. The captured image may not necessarily include an image of the whole of the tire, and it may be enough if a part of the tire is included. Although not particularly limited, it is preferred that the control device 10 acquires a captured image which includes a boundary between the tire and the wheel. The color of a tire is black in general, whereas the color of a wheel is ordinarily white or a metallic color. Since the difference of brightness is large between the tire and the wheel, it is highly possible that the boundary therebetween can be accurately detected as an edge image. In addition or alternatively, a captured image including a boundary between the tire and the road surface may be acquired. This is because there is a difference of brightness also between the tire and the road surface and the boundary therebetween can be detected as an edge image.

The captured image including at least a part of a tire can be captured by the previously-described camera 1b, 1d (see FIGS. 2A and 2B) provided near the left or right door mirror.

The control device 10 of the present embodiment selects a captured image to acquire, in accordance with the steering state of the vehicle. Specifically, when the vehicle is steering right, the control device 10 acquires a right-side captured image captured by the right-side camera 1d provided at the right side of the vehicle. When the vehicle is steering left, the control device 10 acquires a left-side captured image captured by the left-side camera 1b provided at the left side of the vehicle.

When steering right, the front tires are directed rightward, and therefore the captured image by the camera 1d of the right-side mirror includes an image of the boundary between the front-right tire and the wheel, whereas the captured image by the camera 1b of the left-side mirror is an image mainly of the rear and inner side of the front-left tire. Thus, the captured image by the camera 1b does not include an image of the boundary between the tire and the wheel because the boundary is hidden behind the tire. Similarly, when steering left, the front tires are directed leftward, and therefore the captured image by the camera 1b of the left-side mirror includes an image of the boundary between the front-left tire and the wheel, whereas the captured image by the camera 1d of the right-side mirror is an image mainly of the rear and inner side of the front-right tire. Thus, the captured image by the camera 1d does not include an image of the boundary between the tire and the wheel because the boundary is hidden behind the tire. Therefore, the control device 10 of the present embodiment selects a captured image to acquire, in accordance with whether steering right or left. This allows acquisition only of a captured image from which the tire angle can be detected and prevents acquisition of a captured image from which the tire angle cannot be detected, and a useless communication can thus be avoided from being performed.

Determination whether the vehicle is steering right or left can be made on the basis of the detection result by the acceleration sensor (G-sensor) 40 of the terminal apparatus 100 which is brought into the vehicle and travels with the vehicle. As will be understood, in an alternative embodiment, the steering direction of the vehicle may be determined on the basis of the direction of optical flow in the captured images when viewing forward from the vehicle. In an alternative embodiment, the determination may be possible by acquiring winker signal or the like used in the onboard apparatus 200.

The estimated route calculation function will then be described. The control device 10 of the present embodiment calculates an estimated route of the vehicle.

Figure 3A:
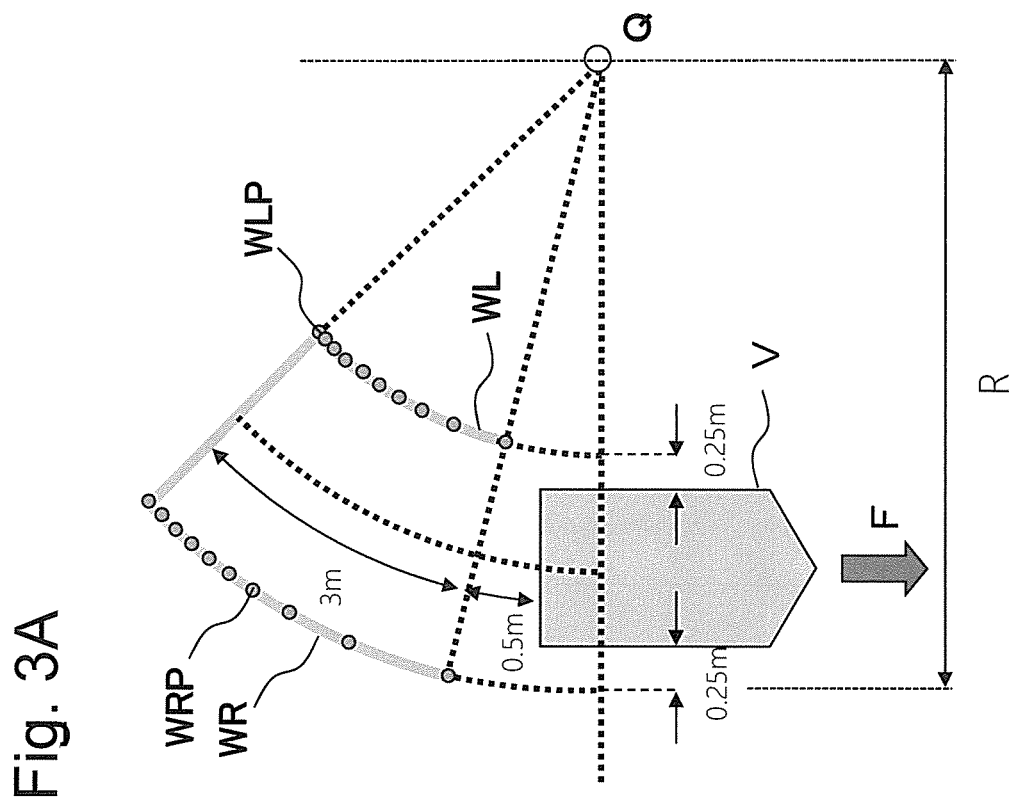
FIG. 3A is a first diagram for explaining a scheme of calculating an estimated route according to the embodiment.

Here, a scheme of calculating the estimated route is described with reference to FIG. 3A to FIG. 3C. FIG. 3A shows a scene in which the vehicle V is traveling backward or backing up (traveling in the opposite direction to the forward direction F). As shown in FIG. 3A, when the vehicle V travels backward with operating the steering wheel, the vehicle travels along estimated pass points WRP and WLP. Lines obtained by connecting the estimated pass points WRP and WLP are estimated routes WR and WL along trajectories of the tires on which the vehicle is predicted to travel. As shown in the figure, the vehicle V travels along the circular trajectories WR and WL which have the center Q of gyration.

In this example, distances between the side surfaces of the vehicle and the estimated routes WR and WL are each 0.25 m, and the estimated routes WR and WL are calculated between a location separated from the rear end of the vehicle by 0.5 m and a location separated from the rear end of the vehicle by 3.5 m, i.e., the estimated routes WR and WL are each about 3 m. Values for defining the estimated routes WR and WL are not particularly limited and can be appropriately set in accordance with the size and type of the vehicle and the situation in which this function is utilized (e.g., the size of a parking space).

When the vehicle travels at a low speed such as during the parking operation, the rotation angle of the steering wheel (steering angle) and the tire angle are proportional to each other, as shown in FIG. 3B. With reference to the correspondence graph of FIG. 3B, the tire angle can be obtained from the steering angle. In the example shown in FIG. 3B, the steering system is configured such that the tire angle comes to 31 degrees when the steering wheel is turned to the limit (full steering) at an angle of 580 degrees (one and a half turn or more of the steering wheel).

Figure 3C:
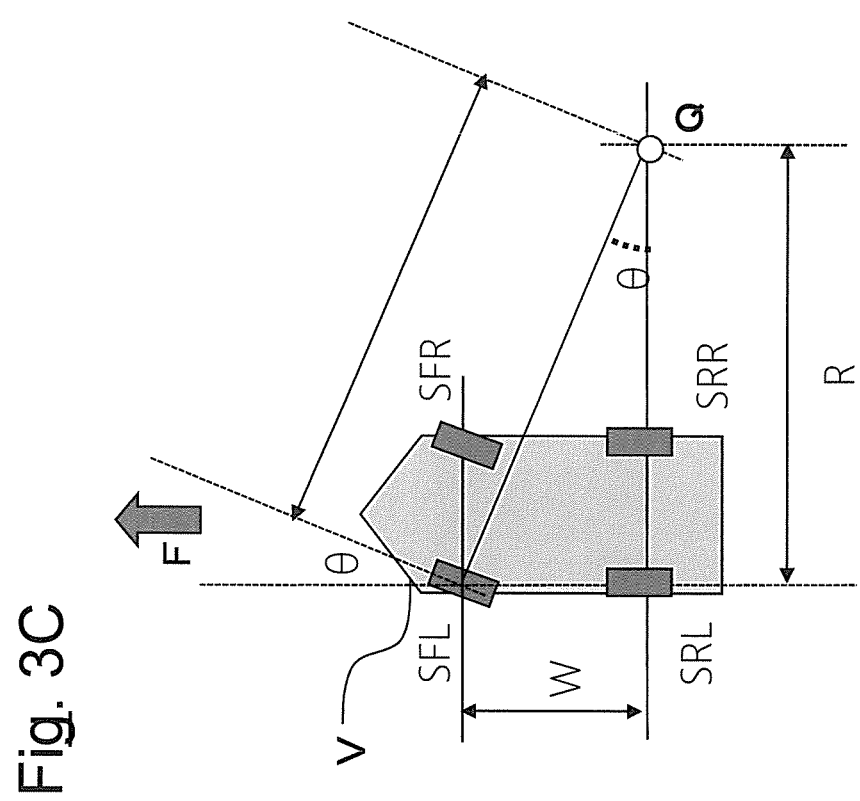
FIG. 3C is a second view for explaining a scheme of calculating the estimated route according to the embodiment.

As shown in FIG. 3C, given the tire angle and a wheelbase W, the radius R of gyration can be obtained from the relationship of $\tan(\theta)=W/R$. The wheelbase W is the distance between the centers of front tires SFL and SFR and rear tires SRL and SRR. The value of the wheelbase W may be preliminarily set as a certain value or as a value depending on the type of vehicle or may also be acquired from the onboard apparatus 200 or a server not shown.

Given the radius R of gyration, the center Q of gyration can be obtained from the relationship with the position of the own vehicle. The estimated routes WR and WL can thus be obtained with reference to the center Q of gyration. In this manner, when information about the steering angle of the steering wheel and the wheelbase is acquired, an estimated route of the vehicle can be calculated.

However, it takes time for the terminal apparatus 100 to acquire information about the steering angle of the vehicle and the like from the onboard apparatus 200 and process the information, and the presentation timing of the estimated route will be delayed. The estimated route at a past time and therefore delayed to be displayed is useless information for the driver.

To this problem, the estimated route presentation apparatus (terminal apparatus) 100 of the present embodiment can calculate an estimated route without using the steering angle of the vehicle (detected value in the onboard apparatus). Specifically, the estimated route presentation apparatus (terminal apparatus) 100 of the present embodiment detects the tire angle from a captured image by the onboard camera, calculates the center of gyration of the vehicle using the tire angle, and presents an estimated route with reference to the center of gyration. This operation can reduce the processing cost for presenting the estimated route using the portable terminal apparatus 100, which is not incorporated in the onboard apparatus, and can also reduce the time required for the presentation process.

Figure 4:
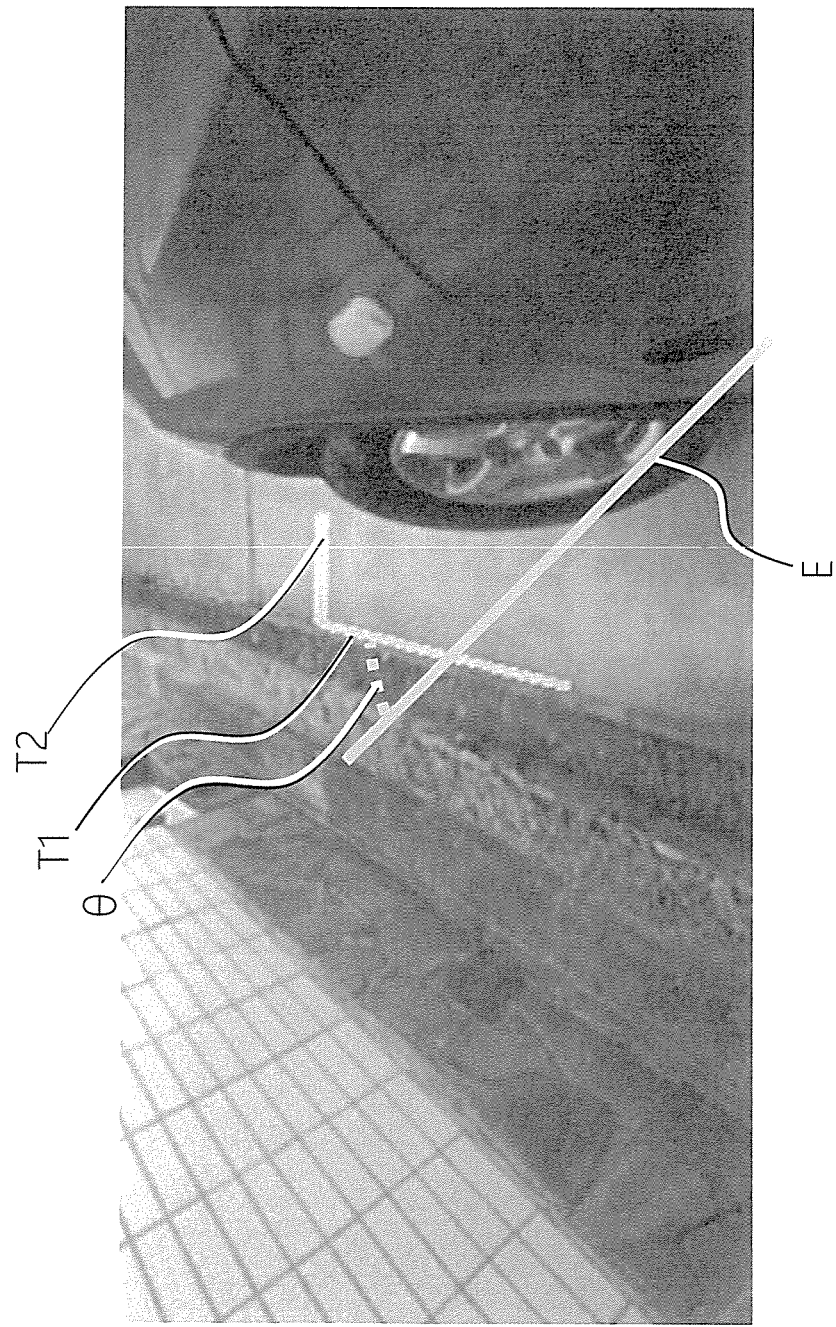
FIG. 4 is a view for explaining a process to calculate the estimated route according to the embodiment.

A scheme of calculating the estimated route according to the present embodiment will be described below. The control device 10 of the present embodiment detects the tire angle from an edge image of the tire extracted from a captured image. FIG. 4 is a view which shows an example of the captured image including a tire. As shown in FIG. 4, there is a difference of brightness value between the tire of black color and the wheel of white color (metallic color), so the edge information based on the difference of brightness value can be detected. An edge straight line E is obtained by connecting a group of edges of which the directions vary within a predetermined range. This edge straight line is used to detect the tire angle. The scheme of detecting the tire angle from the captured image is not particularly limited. The tire angle can be detected, as shown in FIG. 4, as an angle $\theta$ formed between a vehicle side reference line T1 along the left or right side surface of the vehicle (i.e. along the longitudinal direction of the vehicle) and the detected edge straight line. The vehicle side reference line T1 in this example is a straight line which intersects substantially perpendicularly with a forward end reference line T2 along the vehicle width direction. A reference line or reference lines for detecting the tire angle may be appropriately set. In consideration that it is preferred to obtain the tire angle $\theta$ from edge lines, close to the road surface, of the tire, it is preferred that the edge information based on the brightness value is extracted from a region close to the road surface, i.e. a region of which the distance (height) from the road surface is minimum. In other words, it is preferred to obtain the edge straight line E from an edge or edges obtained at the lowest position or lowest positions of the wheel.

Here, with regard to the scheme of calculating the tire angle, two modified examples will be described.

The first modified example is a scheme of utilizing first correspondence information in which an inclination of an edge (edge angle) and the tire angle are preliminarily associated with each other. The control device 10 of the present embodiment refers to the first correspondence information, in which the tire angle is preliminarily associated with an inclination (angle) of an edge of the tire (tire edge) detected from a captured image when the tire angle is maintained (at each state of some tire angles), and detects a tire angle $\theta$ from the inclination of the edge of the tire (edge line E) extracted from the captured image. If the position of an edge of the tire (tire edge) to detect is different, the tire angle may not be accurately obtained. As shown in FIG. 3B, given the steering angle, the tire angle is accurately found. In this modified example, when the onboard camera 1 attached to the side mirror captures a tire image in a state in which a predetermined steering angle is maintained, the inclination of an edge in an image of the tire in the obtained captured image is associated with the steering angle, or the tire angle. With reference to the first correspondence information, the tire angle can be accurately obtained from the edge angle in the image of the tire captured by the onboard camera 1. This allows an accurately estimated route to be calculated based on an accurate tire angle. Although not particularly limited, it is preferred that the predetermined steering angle when preparing the first correspondence information is the maximum steering angle. In parking operation, the driver initiates the operation with the maximum steering angle in general, and the estimated route can therefore be calculated in accordance with the actual steering.

The second modified example is a scheme of preliminarily associating the tire angle with a feature pattern in an image of the tire to utilize pattern matching of images. The control device 10 of the present embodiment refers to second correspondence information, in which the tire angle is preliminarily associated with a feature pattern (template) in an image of the tire detected from a captured image when the tire angle is maintained (at each state of some tire angles), and detects a tire angle on the basis of the feature pattern which has the highest matching degree with the edge feature of the vehicle tire image extracted from the captured image. If a posture of the camera 1 or the like varies, the tire angle may not be accurately detected. As shown in FIG. 3B, given the steering angle, the tire angle is accurately found. In this modified example, when the onboard camera 1 attached to the side mirror captures an image of the tire in a state in which a predetermined steering angle is maintained, the feature in the image of the tire in the obtained captured image is associated with the edge angle. A pattern matching process is performed to compare a plurality of features in the captured image obtained when calculating the estimated route in turn with a feature pattern in the image of the second correspondence information and extract a feature pattern which has the highest matching degree. The edge angle associated with the extracted feature pattern is used as a tire angle of the vehicle which is an object to be detected. According to the pattern matching with a plurality of features included in the captured image, the tire angle can be accurately obtained from the edge angle in the image of the tire captured by the onboard camera 1, even when variation in the attitude of the camera 1 or the like occurs. This allows an accurately estimated route to be calculated based on an accurate tire angle. Although not particularly limited, it is preferred that the predetermined steering angle when preparing the second correspondence information is the maximum steering angle. In general, the driver initiates the parking operation with the maximum steering angle, and the estimated route can therefore be calculated in accordance with the actual steering.

In the present embodiment, to accurately calculate the tire angle, the captured image to be used for calculating the tire angle is selected when steering. When the vehicle is steering right, the control device 10 of the present embodiment detects the tire angle from the captured image by the right-side camera 1d including the boundary between the tire and the wheel from which the edge can be readily detected. When the vehicle is steering left, the control device 10 detects the tire angle from the captured image by the left-side camera 1b including the boundary between the tire and the wheel from which the edge can be readily detected. As previously described, the captured image to acquire may be selected in accordance with the steering state, but even when the captured images by the cameras 1a to 1d are acquired such as due to the necessity of use in a monitoring image, the tire angle is calculated on the basis of the captured image in accordance with the steering direction. This allows an accurately estimated route to be calculated from an accurate tire angle. The scheme as described in the description of the image acquisition function can be used as the scheme of determining the steering state of the vehicle.

In the present embodiment, to accurately calculate the tire angle, a captured image with less shadow region is selected as the captured image to be used when calculating the tire angle. The control device 10 of the present embodiment detects the tire angle using a captured image with less shadow region of low luminance. Specifically, the control device 10 extracts a shadow region (regions) which has (have) a luminance value of less than a predetermined value and is (are) included in captured images by the cameras 1a to 1d provided at different positions of the vehicle. The control device 10 selects a captured image in which the ratio of area occupied by the shadow region (regions) extracted in the captured image is low, i.e. selects a captured image with less shadow region. The control device 10 detects the tire angle on the basis of the edge feature of the tire extracted from the selected captured image. In this manner, an accurate estimated route can be calculated by avoiding a captured image including much shadow region from which the edge cannot be accurately detected, and detecting an accurate tire angle from a captured image with less shadow region.

In the present embodiment, to accurately calculate the tire angle, when the luminance (illuminance) is insufficient, a captured image after turning on (putting on) the lighting device LP is selected as the captured image for calculating the tire angle. When the luminance (illuminance) value around the vehicle detected by the luminance (illuminance) detection device LD is less than a predetermined value, the control device 10 of the present embodiment outputs a lighting up instruction to turn on the lighting device LP. This lighting instruction is output via the vehicle controller 3 to the lighting device LP, which is thereby caused to light. Thus, when the luminance value is less than the predetermined value, the lighting device LP is turned on, and the edge is accurately detected from the captured image under sufficient luminance. This allows an accurately estimated route to be calculated from an accurate tire angle.

As described above, the control device 10 of the terminal apparatus 100 of the present embodiment obtains (detects) the tire angle of the own vehicle. The control device 10 then calculates the center of gyration of the vehicle on the basis of the obtained tire angle, and also calculates an estimated route of the vehicle with reference to the center of gyration. As described with reference to FIG. 3A to FIG. 3C, given the tire angle (steering angle) and the wheelbase W, the radius R of gyration of the vehicle and therefore the center Q of gyration can be obtained from the relationship of $\tan(\theta)=W/R$. In this example, as shown in FIG. 3C, the tire angle is used to calculate the center of gyration of the vehicle, thereby to derive the estimated route with reference to the center of gyration. The value of the wheelbase W may be preliminarily acquired as a certain value or as a value depending on the type of vehicle when initiating this process, or may otherwise be preliminarily stored in the terminal apparatus 100.

According to the schemes of the present embodiment, the estimated route can be calculated without successively acquiring detection information, such as a steering angle, which might be required when calculating the estimated route.

The presentation control function of the control device 10 of the present embodiment will then be described. The control device 10 of the terminal apparatus 100 of the present embodiment causes the display 31 of the terminal apparatus 100 to present the calculated estimated route. The control device 10 refers to information about the size and layout of the display area, positions, and pixels, and presents the obtained estimated route on the display 31. The control device 10 of the present embodiment presents the estimated route such that it is superimposed on the monitoring image (captured image, viewpoint conversion image). In other words, the control device 10 presents (renders) the estimated route with reference to the coordinates of the monitoring image.

Thus, according to the terminal apparatus (estimated route presentation apparatus) 100 of the present embodiment, the estimated route is obtained from the captured image by the onboard camera 1 without acquiring detection results such as from the speed sensor and steering sensor of the onboard apparatus 200. This allows a simple process to present the estimated route, and the estimated route can be presented after a short time of processing. As a result, the estimated route of the vehicle can be presented in real time (without delay and promptly) on the portable terminal apparatus which is not incorporated in the onboard apparatus.

Figure 5:
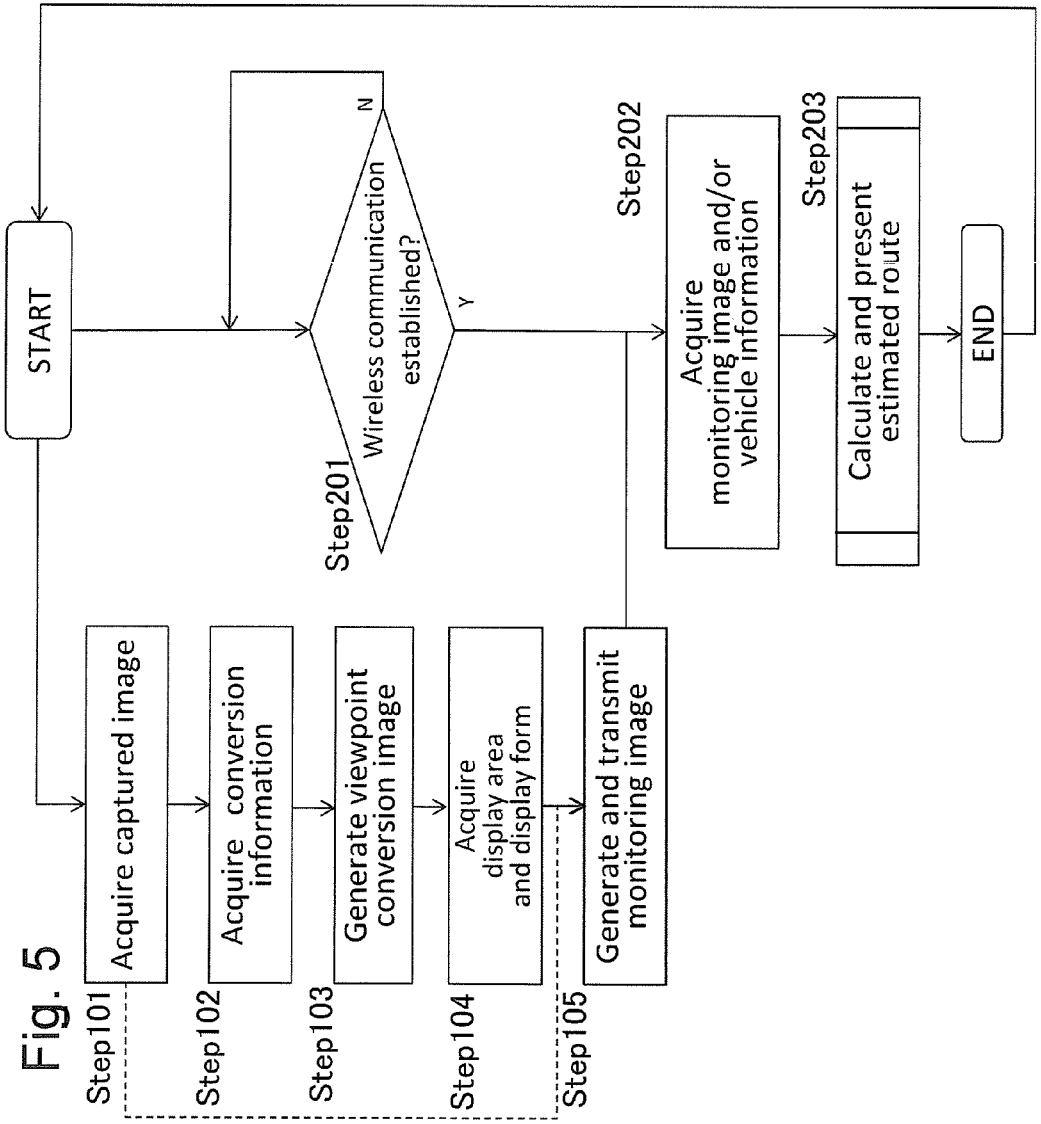
FIG. 5 is a flowchart showing a control procedure performed in the estimated route presentation system of the embodiment.
Figure 6:
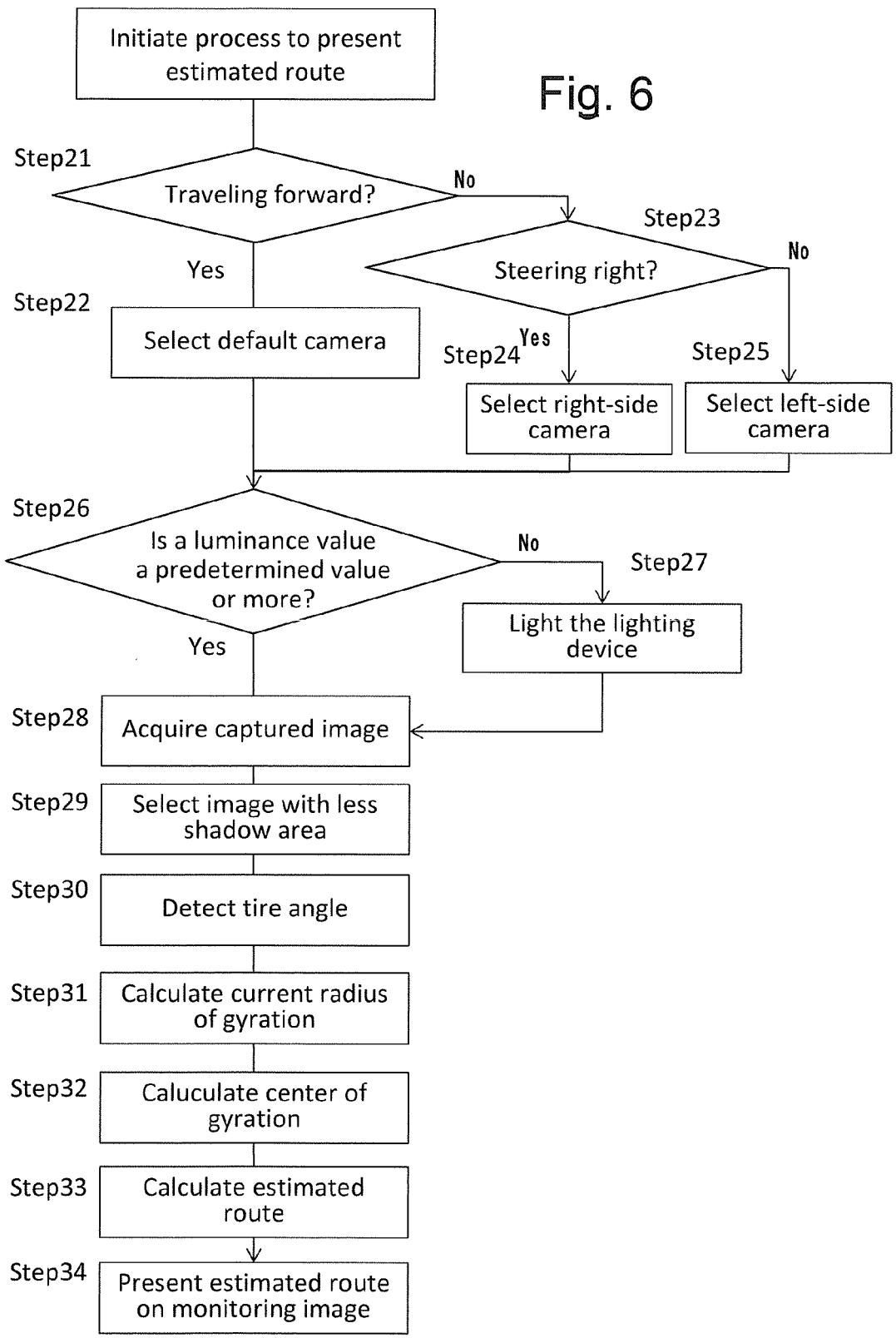
FIG. 6 is a flowchart showing a control procedure for a process to calculate the estimated route according to the embodiment.

Processing procedures performed in the estimated route presentation system 1000 according to an embodiment of the present invention will be described below. FIG. 5 is a flowchart which shows a control procedure performed in the estimated route presentation system 1000 of the present embodiment, and FIG. 6 is a flowchart which shows a control procedure of a scheme to calculate the estimated route in FIG. 5.

Steps 101 to 105 represent a process performed by the onboard apparatus 200, and steps 201 to 203 represent a process performed by the terminal apparatus 100.

In step 101, the cameras 1 of the onboard apparatus 200 of the present embodiment capture images around the vehicle and acquire the captured images.

The vehicle controller 3 of the onboard apparatus 200 has an image processing function which refers to conversion information, such as image capturing parameters, to read out image capturing parameters included in the conversion information and determined in accordance with the type of the own vehicle. Alternatively or in addition, the image capturing parameters determined in accordance with the type of the own vehicle may be acquired from an external server via the communication device 2.

In step 103, the controller 3 of the onboard apparatus 200 uses the acquired image capturing parameters to perform viewpoint conversion of the captured images to generate viewpoint conversion images obtained by coordinate conversion onto a projection plane viewed from a certain viewpoint above the vehicle.

In step 104, the image processing function of the onboard apparatus 200 acquires display information which includes the display area and display form of the terminal apparatus 100. Step 104 is followed by step 105 in which the image processing function generates a monitoring image from the viewpoint conversion images in accordance with the display area and display form of the terminal apparatus 100. The onboard apparatus 200 transmits the generated monitoring image to the terminal apparatus 100. Alternatively, the generation of the monitoring image in accordance with the display information of the terminal apparatus 100 may be performed by the terminal apparatus 100. In this case, the onboard apparatus 200 skips from step 101 to step 105 and transmits the captured and acquired images by the cameras 1 in step 101 to the terminal apparatus 100 without performing any processing.

In step 201, which is processed in the terminal apparatus 100, the terminal apparatus 100 confirms whether wireless communication is established between the terminal apparatus 100 and the onboard apparatus 200. After the wireless communication is established, the terminal apparatus 100 acquires, in step 202, the monitoring image generated by the onboard apparatus 200. The terminal apparatus 100 presents the acquired monitoring image on the display 31 in accordance with predetermined display rules. In step 203, the terminal apparatus 100 calculates an estimated route and superimposes and presents the estimated route on the monitoring image.

The control procedure when calculating the estimated route in the present embodiment will then be described. FIG. 6 is a flowchart which shows a subroutine of step 203 of FIG. 5.

As shown in FIG. 6, in step 21, the control device 10 of the terminal apparatus 100 acquires information whether the vehicle is traveling straight. Determination whether the vehicle is traveling straight is made based on the output signal from the acceleration sensor 40 of the terminal apparatus 100. Alternatively or in addition, the control device 10 may acquire steering information of the vehicle from the onboard apparatus 200 via the communication device 20. If the vehicle is traveling straight, the process proceeds to step 22, while if the vehicle is not traveling straight, the process proceeds to step 23. In step 22, the control device 10 selects a default camera 1. Although not particularly limited, in this example, the control device 10 selects the camera 1 located at the side of the front passenger seat.

In step 23, the terminal apparatus 100 determines whether the vehicle is steering right. If the vehicle is steering right, the right-side camera 1 is selected in step 24. If the vehicle is not steering right, and the vehicle is steering left, the left-side camera 1 is selected in step 25. By selecting the camera 1 to be initiated when steering, the right-side camera 1 is used to ensure to capture a part of an image of the boundary between the tire and the wheel when the vehicle is steering right, while the left-side camera 1 is used to ensure to capture a part of an image of the boundary between the tire and the wheel when the vehicle is steering left.

Then in step 26, the control device 10 confirms the luminance around the selected camera 1. The control device 10 determines whether the luminance value detected by the luminance detection device LD of the camera 1 is a predetermine value or more. If the luminance value is the predetermined value or more, the process proceeds to step 28 in which the control device 10 acquires the captured image. On the other hand, if the luminance value is less than the predetermined value, the process proceeds to step 27 in which the control device 10 outputs to the onboard apparatus 200 an instruction to turn on the lighting device LP provided in the vicinity of the camera 1 which detects that the luminance value is less than the predetermined value. The vehicle controller 3 of the onboard apparatus 200 turns on the lighting device LP provided in the vicinity of the camera 1 which detects that the luminance value is less than the predetermined value.

The selected camera 1 captures an image in the vicinity of the tire under an environment of appropriate luminance. In step 28, the control device 10 of the terminal apparatus 100 acquires the captured image.

In step 29, when the captured images are obtained, the control device 10 selects a captured image in which the area of regions to make shadows is small. This is because the edge of the tire (tire edge) with the road surface or with the wheel cannot be accurately detected if the captured image includes shadows of a large area. When the luminance value of the image is less than a predetermined value in a certain region, the region is determined as that to make shadow.

In step 30, the control device 10 detects a plurality of edges of the tire included in the captured image, and detects an angle between the extending direction of the edge group and the longitudinal direction of the vehicle as a tire angle.

In step 31, the control device 10 uses the tire angle to calculate the current radius of gyration of the vehicle. If necessary in this process, the radius of gyration of the vehicle may be calculated using the value of the wheelbase. The value of the wheelbase may be preliminarily set or may otherwise be acquired before the process. For example, the value of the wheelbase may be acquired via the communication device 20 when bringing the terminal apparatus 100 into the vehicle and initiating the estimated route presentation function. Since the value of the wheelbase is a fixed value, it can be acquired before the process. If the value of the wheelbase is once acquired, therefore, it is possible to continue to use the value because the value does not vary from moment to moment as the steering angle does.

In step 32, the control device 10 obtains the center of gyration from the calculated radius of gyration. In step 33, the control device 10 calculates an estimated route with reference to the center of gyration. Finally in step 34, the control device 10 presents the calculated estimated route on the monitoring image (including the captured image and viewpoint conversion image).

FIG. 7A shows an example in which a plurality of estimated pass points WP (each represented by a circle in the figure) and estimated routes WR and WR are displayed to be superimposed on a monitoring image to which the viewpoint conversion process is not performed (i.e. a captured image). The estimated routes WR and WL are obtained by connecting the estimated pass points. The estimated pass points WP are adjusted to have a regular interval. That is, the estimate pass points WP are adjusted to have a constant pitch on the display coordinates of the display 31. Therefore, the estimated routes WR and WL represented by the estimated pass points WP can be displayed as smooth curved lines. If, despite the vehicle continuously traveling in the actual space, the estimated routes are presented with connecting points having a large angle, the estimated routes may feel strange to the driver. In the present embodiment, the display 31 displays the estimated routes matching the actual motion of the vehicle so that the displayed image does not feel strange (uncomfortable) to the driver.

Figure 7B:
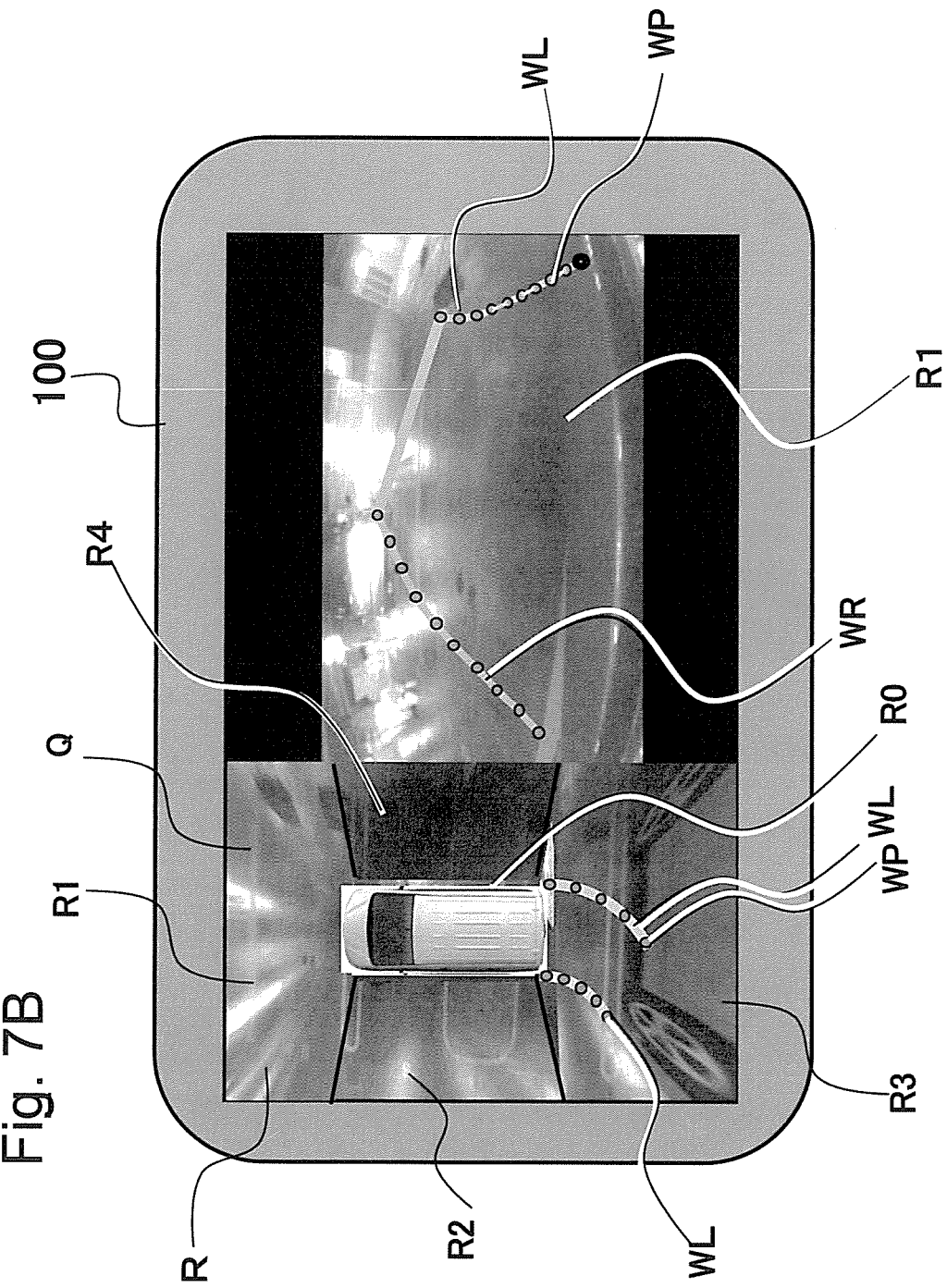
FIG. 7B is a view showing an example of a monitoring image on which the estimated route is superimposed.

FIG. 7B shows an example of displaying a monitoring image to which the viewpoint conversion process is performed (i.e. a viewpoint conversion image) on the left-side screen area of the display 31 of the terminal apparatus 100 while displaying a monitoring image to which the viewpoint conversion process is not performed (i.e. a captured image) on the right-side screen area. In this example, as shown in the figure, a plurality of estimated pass points WP (each represented by a circle in the figure) and estimated routes WR and WR are displayed to be superimposed on both of the monitoring image to which the viewpoint conversion process is performed (i.e. a viewpoint conversion image) and the monitoring image to which the viewpoint conversion process is not performed (i.e. a captured image). The estimated routes WR and WL are obtained by connecting the estimated pass points.

The estimated route presentation apparatus (terminal apparatus) 100 and estimated route presentation system 1000 according to the embodiment of the present invention, which are configured and operate as described above, have advantageous effects as below.

[1] The estimated route presentation apparatus 100 of the present embodiment detects the tire angle from the captured image by the onboard camera, calculates the center of gyration of the vehicle from the tire angle, calculates the estimated route with reference to the center of gyration, and can therefore calculate the estimated route without using a steering angle of the vehicle (a detected value in the vehicle). That is, the estimated route presentation apparatus 100 obtains the estimated route on the basis of information extracted from the captured image by the onboard camera rather than successively acquiring detection information, such as a steering angle, from the onboard apparatus 200. This allows a simple process to present the estimated route, and the estimated route can be presented after a short time of processing. As a result, the estimated route of the vehicle can be timely presented even when the estimated route of the vehicle is presented on the portable terminal apparatus 100 which is not incorporated in the onboard apparatus.

[2] The estimated route presentation apparatus 100 of the present embodiment has the first correspondence information in which the tire angle corresponding to the steering angle is preliminarily associated with an inclination of a tire edge detected from the captured image at each state of some tire angles, and thereby detects the tire angle on the basis of the inclination of the tire edge of the vehicle tire image extracted from the captured image acquired by the onboard camera 1. The estimated route presentation apparatus 100 refers to this first correspondence information and accurately detects the tire angle on the basis of an inclination of the edge in the image of the tire captured by the onboard camera 1. This allows an accurately estimated route to be calculated based on an accurate tire angle.

[3] The estimated route presentation apparatus 100 of the present embodiment alternatively has the second correspondence information in which the tire angle corresponding to the steering angle is preliminarily associated with a feature pattern in an image of the tire in the captured image at each state of some tire angles. The estimated route presentation apparatus 100 refers to this second correspondence information and accurately detects the tire angle from the edge angle in the image of the tire captured by the onboard camera 1. This allows an accurately estimated route to be calculated based on an accurate tire angle.

[4] The estimated route presentation apparatus 100 of the present embodiment selects a captured image to acquire in accordance with whether steering right or left, acquires a captured image from which the tire angle can be detected, and prevents acquisition of a captured image from which the tire angle cannot be detected. This can avoid a useless communication from being performed.

[5] The estimated route presentation apparatus 100 of the present embodiment, when the vehicle is steering right, detects the tire angle from the captured image by the right-side camera 1d including the boundary between the tire and the wheel from which the edge can be readily detected, and when the vehicle is steering left, detects the tire angle from the captured image by the left-side camera 1b including the boundary between the tire and the wheel from which the edge can be readily detected. This allows an accurately estimated route to be calculated based on an accurate tire angle.

[6] The estimated route presentation apparatus 100 of the present embodiment avoids using a captured image including much shadow region from which the edge cannot be accurately detected, and detects an accurate tire angle using a captured image with less shadow region. This allows an accurately estimated route to be calculated.

[7] When the luminance (illuminance) value is less than a predetermined value, the estimated route presentation apparatus 100 of the present embodiment turns on the lighting device LP and accurately detects the edge from the captured image under sufficient luminance (illuminance). This allows an accurately estimated route to be calculated from an accurate tire angle.

[8] The estimated route presentation apparatus 100 of the present embodiment detects the tire angle from the captured image including the boundary between the tire and the wheel at which the difference of luminance value is large in general and from which the edge can be readily detected. This allows an accurately estimated route to be calculated from an accurate tire angle.

[9] According to the estimated route calculation method of the present embodiment, the above-described action and effects can be obtained.

All the embodiments heretofore explained are described to facilitate understanding of the present invention and are not described to limit the present invention. Therefore, it is intended that the elements disclosed in the above embodiments include all design changes and equivalents to fall within the technical scope of the present invention.

In the present description, the estimated route presentation system 1000 comprising the estimated route presentation apparatus 100 (terminal apparatus 100) and the onboard apparatus 200 is described as an aspect of the estimated route presentation system according to the present invention, but the present invention is not limited thereto. The terminal apparatus 100 comprising the control device 10, communication device 20, presentation device 30, and acceleration sensor 40 is described as an aspect of the terminal apparatus according to the present invention, but the present invention is not limited thereto. The onboard apparatus 200 comprising the cameras 1a to 1d, 1, communication device 2, and vehicle controller 3 is described as an aspect of the onboard apparatus according to the present invention, but the present invention is not limited thereto.

The estimated route presentation apparatus 100 (terminal apparatus 100) comprising the control device 10 which executes the image acquisition function, estimated route calculation function, and presentation control function is described as an aspect of the estimated route presentation apparatus comprising an image acquisition unit, estimated route calculation unit, and presentation unit according to the present invention, but the present invention is not limited thereto.

The invention claimed is:

1. An estimated route presentation apparatus for a vehicle, comprising:
   an image acquisition unit configured to acquire a captured image captured using a camera provided on the vehicle, the captured image including at least a part of a vehicle tire image;
   an estimated route calculation unit configured to:
   detect a tire angle from an edge feature extracted from the captured image;
   calculate a center of gyration of the vehicle on a basis of the tire angle; and
   calculate an estimated route of the vehicle with reference to the center of gyration; and
   a presentation unit configured to present the estimated route calculated, wherein
   the estimated route calculation unit extracts a shadow region which has a luminance value of less than a predetermined value and is included in captured images by cameras provided at different positions of the vehicle, selects a captured image in which a ratio of area occupied by an extracted shadow region is low, and detects the tire angle on the basis of the edge feature extracted from a selected captured image.

2. The estimated route presentation apparatus for a vehicle according to claim 1, wherein
   the estimated route calculation unit refers to first correspondence information, in which the tire angle is preliminarily associated with an inclination of a tire edge detected from the captured image at each state of some tire angles, and thereby detects the tire angle on the basis of the inclination of the tire edge of the vehicle tire image extracted from the captured image acquired.

3. The estimated route presentation apparatus for a vehicle according to claim 1, wherein
   the estimated route calculation unit refers to second correspondence information, in which the tire angle is preliminarily associated with a feature pattern in a tire image detected from the captured image at each state of some tire angles, and thereby detects the tire angle on the basis of the feature pattern which has a highest matching degree with the edge feature of the vehicle tire image extracted from the captured image acquired.

4. The estimated route presentation apparatus for a vehicle according to claim 1, wherein
   the image acquisition unit acquires a right-side captured image captured by a right-side camera provided at the right side of the vehicle or a left-side captured image captured by a left-side camera provided at the left side of the vehicle, and
   the image acquisition unit acquires the right-side captured image when the vehicle is steering right and acquires the left-side captured image when the vehicle is steering left.

5. The estimated route presentation apparatus for a vehicle according to claim 1, wherein
   the image acquisition unit acquires a right-side captured image captured by a right-side camera provided at the right side of the vehicle or a left-side captured image captured by a left-side camera provided at the left side of the vehicle, and
   the estimated route calculation unit detects the tire angle on the basis of the edge feature extracted from the right-side captured image when the vehicle is steering right and detects the tire angle on the basis of the edge feature extracted from the left-side captured image when the vehicle is steering left.

6. The estimated route presentation apparatus for a vehicle according to claim 1, further comprising:
   a lighting unit provided in a vicinity of the camera; and
   a brightness detection unit configured to detect luminance around the vehicle, wherein
   the image acquisition unit outputs a lighting instruction to turn on the lighting unit when the detected luminance value around the vehicle is less than a predetermined value.

7. The estimated route presentation apparatus for a vehicle according to claim 1, wherein
   the captured image includes at least a part of an image of a boundary between the vehicle tire and a wheel.

8. An estimated route presentation method for a vehicle, causing a computer to execute:
   a process of extracting an edge feature of a vehicle tire from an image corresponding to at least a part of the vehicle tire, the image being included in a captured image by a camera provided on the vehicle;
   a process of calculating an estimated route of the vehicle with reference to a center of gyration of the vehicle on a basis of a tire angle of the tire detected from the edge feature of the tire; and
   a process of outputting the estimated route to external, wherein
   the process of calculating an estimated route includes:
   extracting a shadow region which has a luminance value of less than a predetermined value and is included in captured images by cameras provided at different positions of the vehicle;
   selecting a captured image in which a ratio of area occupied by the extracted shadow regions is low; and
   detecting the tire angle on a basis of the edge feature extracted from a selected captured image.

* * * * *